(12) United States Patent  
Holl et al.

(10) Patent No.: US 12,413,436 B2  
(45) Date of Patent: Sep. 9, 2025

(54) COLLABORATION AND COGNITIVE ANALYSIS FOR HYBRID WORK VISUAL AID SESSIONS

(71) Applicant: Cisco Technology, Inc., San Jose, CA (US)

(72) Inventors: Steven Michael Holl, Sarasota, FL (US); Jason Michael Coleman, Hendersonville, NC (US); Jason A. Kuhne, Hopkinton, MA (US); Gonzalo A. Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/361,058

(22) Filed: Jul. 28, 2023

(65) Prior Publication Data

US 2025/0039010 A1    Jan. 30, 2025

(51) Int. Cl.  
*H04L 12/18* (2006.01)

(52) U.S. Cl.  
CPC ...... *H04L 12/1831* (2013.01); *H04L 12/1818* (2013.01)

(58) Field of Classification Search  
CPC .................. H04L 12/1831; H04L 12/1818  
See application file for complete search history.

(56) References Cited

U.S. PATENT DOCUMENTS

| 11,265,181 | B1 * | 3/2022 | Springer | ............ | H04N 21/4318 |
| 12,175,614 | B2 * | 12/2024 | Rudman | ................ | G06V 10/25 |
| 2013/0342486 | A1 * | 12/2013 | Xin | ......................... | G06F 3/041 |
| | | | | | 345/173 |
| 2014/0297646 | A1 | 10/2014 | Bastiaens et al. | | |
| 2015/0015504 | A1 * | 1/2015 | Lee | ......................... | G06T 11/206 |
| | | | | | 345/173 |
| 2017/0011740 | A1 | 1/2017 | Gauci | | |
| 2019/0037171 | A1 * | 1/2019 | Nagpal | .................. | H04N 7/147 |
| 2019/0065012 | A1 * | 2/2019 | Masi | ........................ | G09G 5/14 |
| 2019/0088153 | A1 * | 3/2019 | Bader-Natal | ........... | H04N 7/147 |
| 2019/0220802 | A1 * | 7/2019 | Horikiri | .......... | G06Q 10/063118 |
| 2019/0260964 | A1 | 8/2019 | Nagpal et al. | | |

(Continued)

FOREIGN PATENT DOCUMENTS

WO    2022/229755 A1    11/2022

OTHER PUBLICATIONS

Ni, "Digital Sticky Notes," Technical Disclosure Commons, https://www.tdcommons.org/dpubs_series/3322, Jun. 15, 2020, 5 pages.

(Continued)

*Primary Examiner* — Blake J Rubin  
(74) *Attorney, Agent, or Firm* — Edell, Shapiro & Finnan, LLC

(57) ABSTRACT

In some aspects, the techniques described herein relate to a method including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

21 Claims, 12 Drawing Sheets

(56) References Cited

U.S. PATENT DOCUMENTS

| | | | |
|---|---|---|---|
| 2019/0297126 A1* | 9/2019 | Graziano | H04L 51/08 |
| 2019/0325771 A1* | 10/2019 | Ghatage | G06F 1/163 |
| 2019/0347783 A1* | 11/2019 | Salgian | G02B 27/017 |
| 2020/0092341 A1* | 3/2020 | Wang | H04L 51/216 |
| 2020/0201522 A1* | 6/2020 | Faulkner | G06F 3/0485 |
| 2020/0202634 A1* | 6/2020 | Faulkner | G06F 21/604 |
| 2021/0334754 A1 | 10/2021 | Dhillon et al. | |
| 2021/0342785 A1* | 11/2021 | Mann | G06F 40/186 |
| 2021/0352120 A1* | 11/2021 | Masi | H04L 67/025 |
| 2021/0373741 A1 | 12/2021 | Agarawala et al. | |
| 2021/0399911 A1* | 12/2021 | Jorasch | H04L 12/1818 |
| 2022/0086393 A1* | 3/2022 | Peters | H04N 7/147 |
| 2022/0108276 A1* | 4/2022 | Stringham | G06F 3/04817 |
| 2022/0141265 A1* | 5/2022 | Leland | G06F 3/165 709/204 |
| 2022/0343057 A1* | 10/2022 | López Villarroel | H04L 65/4015 |
| 2022/0398060 A1* | 12/2022 | Kadonoff | H04L 67/131 |
| 2023/0086055 A1* | 3/2023 | Park | H04N 7/147 715/753 |
| 2023/0091949 A1* | 3/2023 | Erasmus | G06F 3/017 715/753 |
| 2023/0133265 A1* | 5/2023 | Springer | H04N 7/147 348/14.03 |
| 2023/0421620 A1* | 12/2023 | Arngren | H04L 12/1822 |
| 2024/0040084 A1* | 2/2024 | Mayfield | G06F 3/1454 |
| 2024/0184989 A1* | 6/2024 | Mann | G06F 40/166 |
| 2024/0214454 A1* | 6/2024 | Singh | G06F 3/011 |

OTHER PUBLICATIONS

Mural, "Free Online Sticky Notes for Team Collaboration," https://www.mural.co/use-case/sticky-notes, retrieved on Jul. 25, 2023, 9 pages.

Ideaflip, "Online Sticky Notes," https://ideaflip.com, retrieved on Jul. 25, 2023, 8 pages.

Jibb, "Collaborate Better," https://www.jibb.ai, retrieved on Jul. 25, 2023, 6 pages.

Lucidspark, "A virtual whiteboard for real-time collaboration," https://lucidspark.com, retrieved on Jul. 25, 2023, 10 pages.

Weje, "Online sticky notes for better whiteboarding," https://weje.io/online-sticky-notes-board, retrieved on Jul. 25, 2023, 5 pages.

Miro, "Online Sticky Notes for Virtual Collaboration," https://miro.com/online-sticky-notes/, retrieved on Jul. 25, 2023, 9 pages.

Chrome Web Store, "Sticky Notes," https://chrome.google.com/webstore/detail/sticky-notes/nbjdhgkkhefpifbifjiflpaajchdkhpg?hl=en, retrieved on Jul. 25, 2023, 7 pages.

3M, "The Post-it® App for Microsoft Teams," https://www.post-it.com/3M/en_US/post-it/ideas/teams/, retrieved on Jul. 25, 2023, 7 pages.

Kajiwara, et al., "Tracky Notes: Trackable Sticky Notes for Indexing a Video of Meetings," Group '16, Nov. 2016, 4 pages.

\* cited by examiner

902 { 21:12 - Doug created card |c157895-915b-4827-bb2c-de1594fffe81|, local reference id |A311DS9| with detected text |'Great Idea #4'|

912 { 22:08 - Melissa said "I think Doug's card fits better over on card B"

22:10 - Doug said "I agree"

914 { 22:11 - Melissa moved A311DS9 from parent D43102 to parent C28038.

FIG.9

COLLABORATION AND COGNITIVE ANALYSIS FOR HYBRID WORK VISUAL AID SESSIONS

TECHNICAL FIELD

The present disclosure relates to hybrid collaborative communication sessions, i.e., collaborative communication sessions that include physical participants and remote participants.

BACKGROUND

Hybrid collaboration sessions or hybrid collaborative communication sessions are common workplace activities. People connect together from workplaces and remote locations to engage in complex problem-solving sessions using video conference technology. These sessions may involve brainstorming, organization design, design thinking sessions, or Agile sprint planning and retrospectives. The potential in these sessions to share information, solve problems and generate new ideas which drive innovation makes this a high-value activity for organizations in this current era of information.

In hybrid work, attendees are collaborating remotely with others sharing a physical space. This means participants' overall experience and ability to contribute effectively can vary greatly. For example, when sticky notes are placed or moved around on a whiteboard in a physical room, it is easy for the remote participants to lose situational context of what is happening. Virtual attendees may struggle to piece together all that is happening in the room at that moment and reach the same level of comprehension as those physically present in the room.

BRIEF DESCRIPTION OF THE DRAWINGS

FIG. 9 illustrates a digital transcript generated according to the disclosed hybrid collaborative communication session visual aid techniques, according to an example embodiment.

DETAILED DESCRIPTION

Overview

Figure 1A:
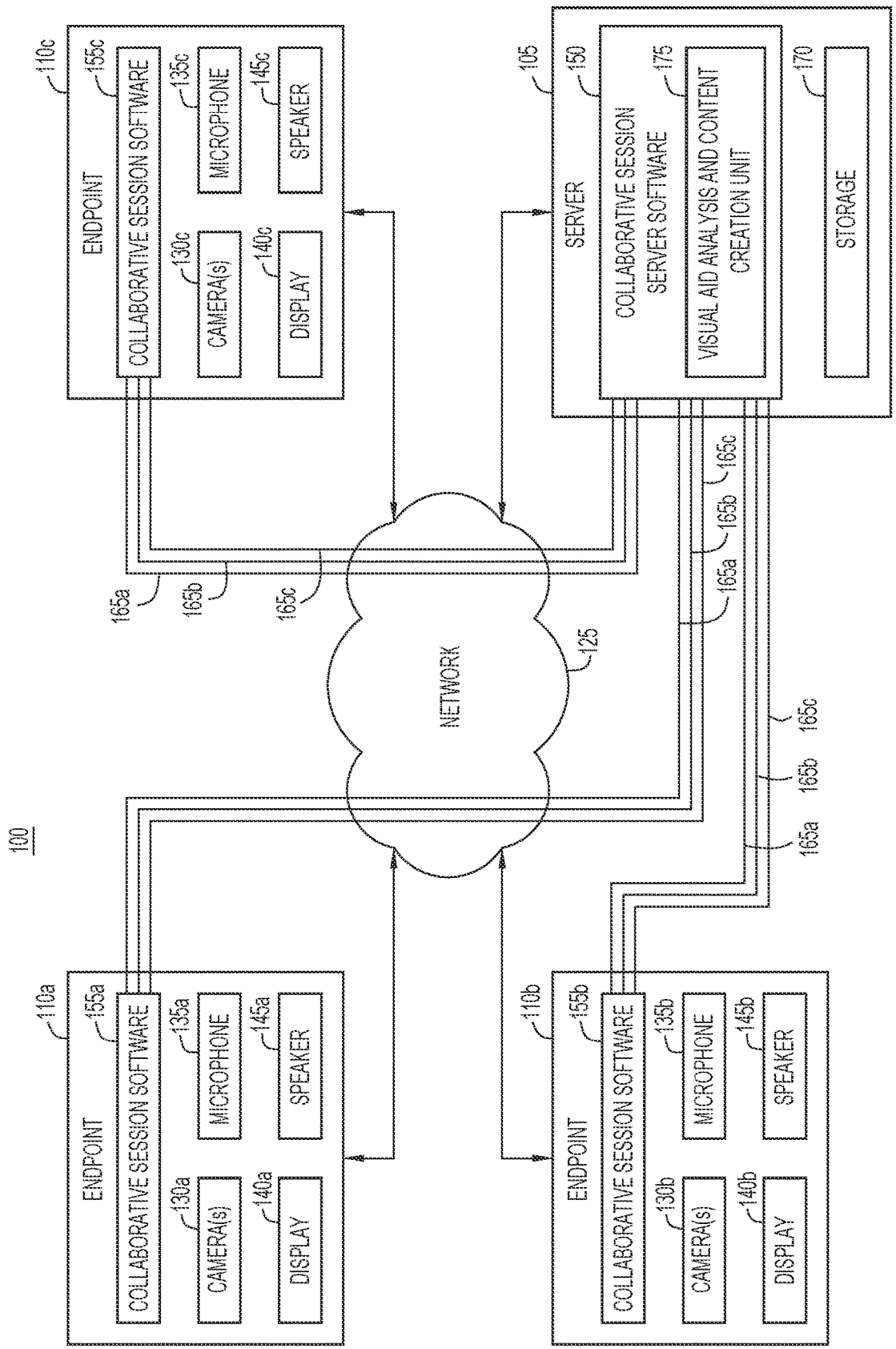
FIG. 1A is a system diagram of a hybrid collaborative communication session system configured to implement the hybrid collaborative communication session visual aid techniques disclosed herein, according to an example embodiment.

In some aspects, the techniques described herein relate to a method including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

In some aspects, the techniques described herein relate to an apparatus including: a communication interface configured to enable network communications; a memory; and one or more processors coupled to the communication interface and the memory, wherein the one or more processors are configured to perform operations including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

In some aspects, the techniques described herein relate to one or more tangible non-transitory computer readable media encoded with instructions, wherein the instructions, when executed by one or more processors cause the one or more processors to perform operations including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

Example Embodiments

The techniques disclosed herein are directed to cognitive applications that can be applied to real-time hybrid work online/web-based meetings (i.e., hybrid collaborative communication sessions) that contain visual aids, such as sticky notes. By applying artificial intelligence/machine learning (AI/ML) applications to augmented reality/virtual reality (AR/VR) environments, the disclosed techniques may generate mixed reality environments that incorporate visual aids, such as sticky notes, into sessions that embody a richer experience than a pure in-person analog session. As described below, the disclosed techniques digitize physical visual aids presented during a hybrid collaborative communication session, extract content from the digitized visual aids, and generate collaborative session content from the content, possibly in conjunction with user interactions with the visual aids.

By way of background, in hybrid collaborative communication sessions, i.e., collaborative communication sessions such as video conferences that combine in-person participants and remote participants, the overall experience and ability of participants to effectively contribute may vary greatly. For example, when sticky notes are placed or moved around on a whiteboard in a physical room, it is easy for the remote participants to lose situational context of what is happening. Virtual or remote attendees may struggle to piece together all that is happening in the room at that moment and may fail to reach the same level of comprehension as those physically present in the room.

Another key challenge in hybrid work environments may be that there is valuable context in the sequence and circumstances that transpire during a hybrid collaborative communication session which may not be captured in a meaningful way via hybrid collaborative communication session systems. Furthermore, when a hybrid collaborative communication session is over, determining the insights, outcomes, next steps and meanings of what transpired during the collaborative session is often a manual activity. Even if the outcome of the collaborative session is captured, the ability to extract context and perform analytics on the content of the collaborative session may be limited.

Accordingly, the techniques disclosed herein recognize the intelligent workflow of interacting with visual aids presented during a collaborative session, such as sticky notes, and the human behavior related to it. By digitizing and applying cognitive applications to the digitized visual aid/sticky notes sessions, the techniques described herein may be used to develop intelligence from the workflow beyond what is possible in a purely physical session, creating collaborative outcomes that are greater than those that exist solely in the physical room.

In an intelligent and digital-powered world, regardless of participants' physical presence or method of access, unique techniques may be leveraged to make a hybrid collaborative communication session experience with mixed reality that is stronger, when compared to strict analog collaboration in a physical room. By digitizing the experience, the disclosed techniques may unlock new cognitive insights providing for a unique opportunity to better support how people collaborate.

Furthermore, digitizing and harvesting information from hybrid collaborative communication sessions, particularly information harvested from visual aids (e.g., sticky notes presented during the session) may provide for opportunities in human persona profiling, recommendation engines based on historical submissions/contributions, and AI/ML applications for intelligent categorization, deduplication, and organization throughout the idea creation process. All of these possibilities may come together for a differentiated experience as a hybrid work virtual planning session.

Accordingly, the disclosed techniques describe cognitive applications that can be applied to real-time hybrid work or collaborative sessions that include visual aid (e.g., sticky note) sessions. By applying AI/ML applications to AR/VR environments, the disclosed techniques may create a mixed reality environment visual aid session that embodies a richer experience than a pure in-person analog session.

The disclosed techniques leverage three key constructs, as enumerated below:
1. Creation and placement of data;
2. Extraction, digitization and structured storage of the created data; and
3. Determining cognitive outcomes from structured data.

Figure 1B:
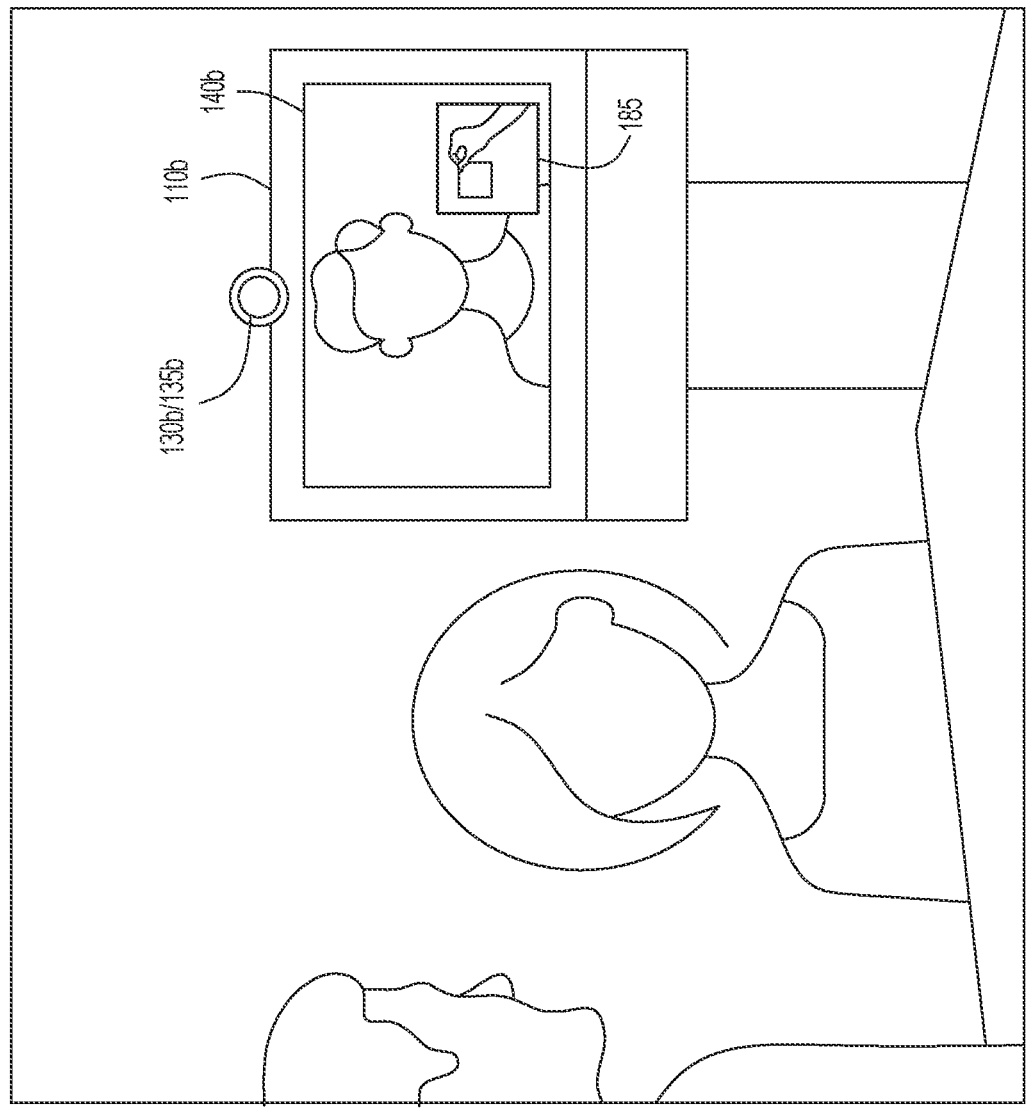
FIG. 1B illustrates a first hybrid collaborative communication session environment established by the hybrid collaborative communication session system of FIG. 1A, according to an example embodiment.
Figure 1C:
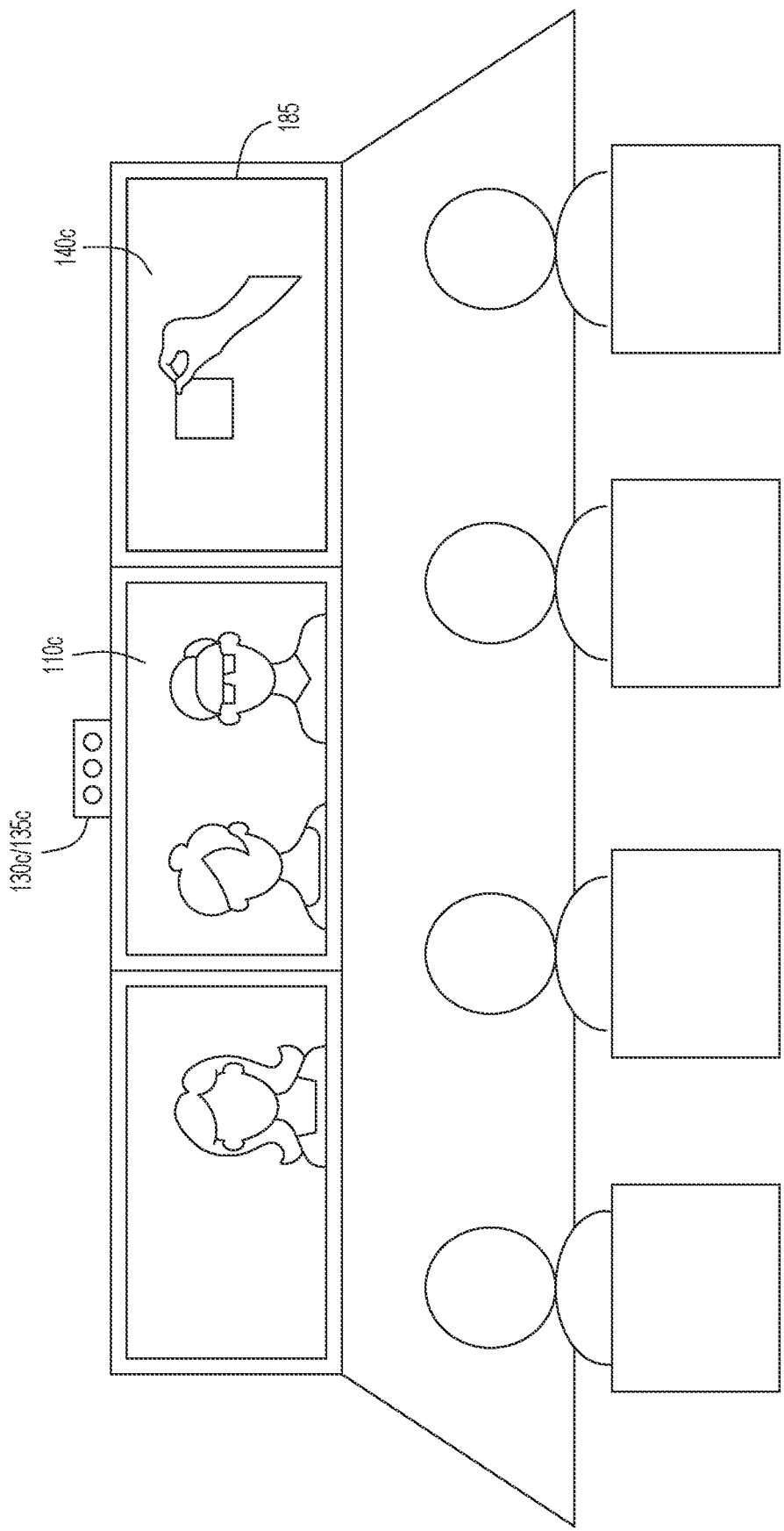
FIG. 1C illustrates a second hybrid collaborative communication session environment established by the hybrid collaborative communication session system of FIG. 1A, according to an example embodiment.

With reference first made to FIGS. 1A-1C, shown is an example hybrid collaborative communication session system 100 configured to implement the disclosed techniques. System 100 includes server 105 and endpoint devices 110a, 110b, 110c (110a-110c). Endpoint device 110a may be a suitable fixed device (e.g., a desktop computing device, a laptop computing device connected to external input/output devices, a video conference endpoint device, etc.) while endpoint device 110b may be a suitable mobile device (e.g., smartphone, laptop, tablet, etc.). Endpoint device 110c, on the other hand, may be a device used within an environment shared by a number of users who are physically within the same location, such as a video conference session endpoint arranged within a conference room. All of endpoint devices 110a-110c may be capable of communicating over network 125. Network 125 may be any suitable network to enable various components of system 100 to communicate with each other, such as the Internet.

Endpoint devices 110a-110c may enable respective participants to participate in an online collaborative session (e.g., a video teleconference). To that end, endpoint devices 110a-110c respectively include cameras 130a, 130b, 130c (130a-130c), microphones 135a, 135b, 135c (135a-135c), displays 140a, 140b, 140c (140a-140c), speakers 145a, 145b, 145c (145a-145c), and collaborative session software 155a, 155b, 155c (155a-155c). According to one or more specific example embodiments, one or more of the cameras 130a-130c, microphones 135a-135c, displays 140a-140c, and speakers 145a-145c may be incorporated into VR/AR headsets or other VR/AR devices.

In one example, server 105 may facilitate, via collaborative session server software 150, the distribution of a plurality of media streams 165a, 165b, 165c (165a-165c) (e.g., audio streams, video streams, application data streams, chat data streams, screen sharing data streams, etc.). For example, the cameras 130a-130c associated with endpoints 110a-110c, respectively, may capture video, which collaborative session software 155a-155c transmits to server 105, respectively. Collaborative session server software 150 then redistributes the video to endpoint devices 110a-110c as media stream 165a. The video may then be displayed on displays 140a-140c. Similarly, microphones 135a-135c may capture audio (e.g., audio of the user associated with endpoint devices 110a-100c), which collaborative session software 155a-155c transmits to server 105, respectively. Collaborative session server software 150 then distributes the audio to endpoint devices 110a-110c as media stream 165b.

The audio may then be replayed via speakers 145a-145c. Similarly, collaborative session software 155a-155c may capture application data executing on endpoint devices 110a-110c, such as a shared document, and transmit this data to server 105, respectively. Collaborative session server software 150 then redistributes the application data to endpoint devices 110a-c as media stream 165c. The application data may then be displayed by collaborative session software 155a-155c on displays 140a-140c.

During a hybrid collaborative communication session, a user may place a visual aid (e.g., a sticky note) in a physical room in which one of endpoints 110a-110c is located. The cameras 130a-130c may capture the visual aids used in the physical locations, and provide the visual data associated with the visual aids to server 105.

The collaborative session server software 150 may analyze the video provided by the cameras 130a-130c to digitize the visual aid. For example, included in collaborative session server software 150 is visual aid analysis and content creation unit 175. The digitalization of the visual aids may include extraction of the content included in the visual aids, which is stored in storage 170. The structured content stored in storage 170 is analyzed by visual aid analysis and content creation unit 175. As explained in detail below, visual aid analysis and content creation unit 175 may use AI/ML techniques to create new hybrid collaborative communication session content, which may be included in media streams 165a-165c. As illustrated in FIGS. 1B and 1C, the newly created collaborative session content 185 may be displayed in displays 140a-140c. However, it is not necessary that the newly created collaborative session content be displayed as part of the collaborative session.

Figure 2:
FIG. 2 illustrates a sticky note visual aid that may be used in conjunction with the disclosed hybrid collaborative communication session visual aid techniques, according to an example embodiment.

As illustrated in FIG. 2, to assist in the digitization performed by collaborative session server software 150, the visual aids 205 used during collaborative sessions may include a sticker including a quick response (QR) code 210. Encoded in the QR code 210 may be information that assists in the digitization of the visual aid 205. For example, the data encoded in QR code 210 may indicate the collaborative session participant associated with the visual aid 205. Accordingly, QR code 210 may allow the collaborative session server software 150 of FIG. 1A to more easily digitize and keep track of which participant presented visual aid 205 in the collaborative session. QR code 210 may also include additional metadata that may be used by collaborative session server software 150 of FIG. 1A. However, QR code 210 is not the only way that collaborative session server software 150 may digitize or determine a participant to associate with visual aid 205. For example, a multi-camera system and speech detection may be used to determine which participant presented a particular visual aid. Additionally, camera vision may be used to determine attributes of the visual aid such as the placement of the visual aid relative to other visual aids, colors of the visual aid (which may be particularly relevant for sticky note visual aids), the sequence of placement of the visual aid relative to others, and other factors such as how closely sticky note visual aids are grouped together in the hybrid collaborative communication session environment.

Once a visual aid is presented and digitized, the content of the visual aid may be extracted, digitized and structurally stored. For example, when collaborative session server software 150 of FIG. 1A detects that a participant has presented a visual aid with specific content at a given time and place, camera vision (sometimes referred to as "machine vision") may be used to perform handwriting analysis to digitize the content of the visual aid. Word clustering may then be used to identify the theme and content of the text contained on the visual aid, and data associated with the content of the visual aid may be stored in a structured format for advanced analysis. For example, digitized data may be stored in a structured format, such as JavaScript Object Notation (JSON) or Yet Another Markup Language (YAML). The structured data may include an object identifier, an indication of the content contained in the visual aid, identifiers for the content, and identifiers for how the content may relate to other visual aid content. The structured data may also include a history of participant interactions with the visual aid. This history of interactions may include timestamps indicating when in the collaborative communication session the visual aid was presented, when subsequent interactions took place, identifiers indicting the participant who made the interaction, and indications of the interaction type.

The analysis of the content of the visual aid may include classifying the content into one or more categories. Based on the categories into which the content is classified, it may be determined how closely the content is related to other categories, and therefore, how closely it is related to other digitized content included in the hybrid collaborative communication session.

Once the visual aid and its content has been digitized, the visual aid may be placed in a 3D synthetic environment associated with the hybrid collaborative communication sessions, such as on a virtual shared whiteboard that is incorporated into the hybrid collaborative communication session. Such a shared whiteboard and the digitized version of the visual aid may be viewed by a 3D VR or AR headset worn by a participant in the collaborative session.

However, the disclosed techniques are not limited to displaying digital versions of physical visual aids presented during collaborative sessions. Once the data from the visual aids has been digitized and structurally stored, the digitized data of the visual aid's interactions during the collaborative communication session (e.g., the content of the content's consequential metadata and relationships) are harvested for more effective real-time collaboration. The disclosed techniques leverage the harvested data to generate or determine outcomes or content for the collaborative session. In other words, additional collaborative session content is derived based upon user interactions with the visual aids during the hybrid work or collaborative session.

Examples of the collaborative session content derived from the user interactions with the visual aids include:

AI classification of visual aids, augmenting the reality of the visual aid itself;

Automatic relocation of visual aids into common clustered locations;

Annotating users as they speak, displaying their information relative to the collaborative session with their associated visual aid content;

Providing breakout session participant recommendations from the data determined from visual aids participants have presented during the hybrid collaborative communication session;

Generating digital transcripts and behavior analytics based on the visual aids that are presented, the content of the visual aids, who created them, and any post-creation interactions with that visual aids (referenced in speech, moved location, etc.); and Drawing context and relevant inferences, organizing session content and future planning based upon the visual aid content.

Figure 3:
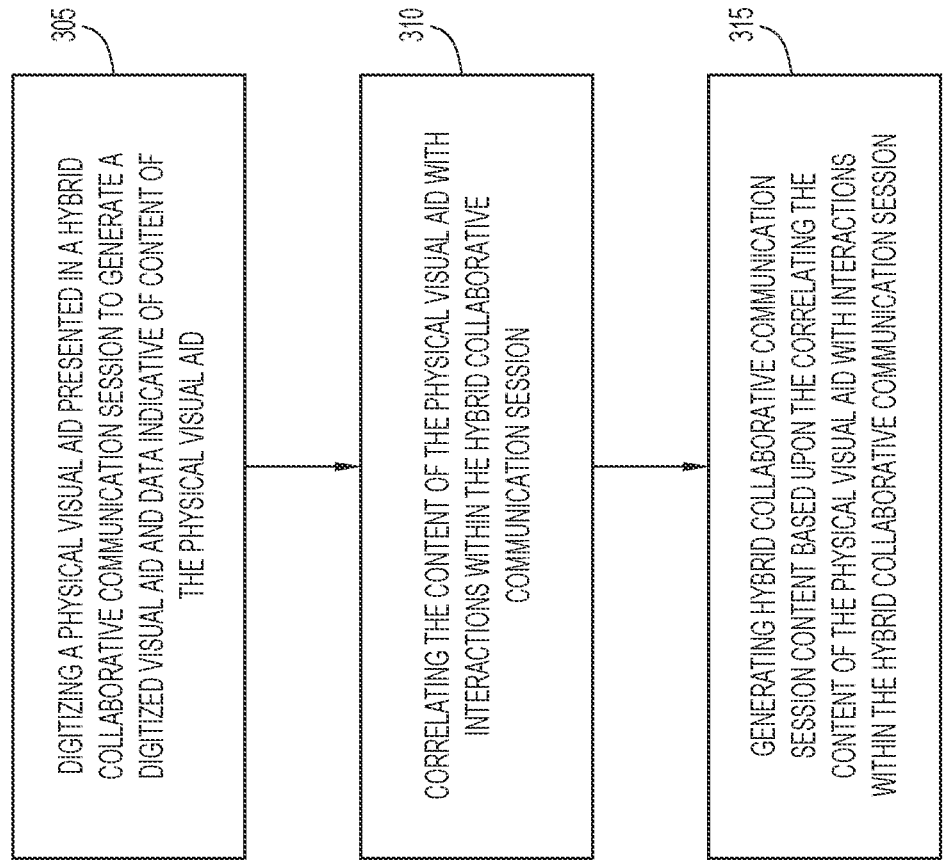
FIG. 3 is a flowchart providing a generalized process flow for implementing the disclosed hybrid collaborative communication session visual aid techniques, according to an example embodiment.

Accordingly, illustrated in FIG. 3 is a flowchart 300 providing a generalized process flow for implementing the disclosed techniques. Flowchart 300 begins in operation 305 where a physical visual aid presented during a hybrid collaborative communication session is digitized. The digitization of the physical visual aid includes generating a digitized visual aid and generating data indicative of the content of the physical visual aid. For example, a participant in a hybrid collaborative communication session may present a sticky note visual aid during a hybrid collaborative communication session. The note and its content are digitized. This digitizing may include creating a digital representation of the physical visual aid, deriving and digitizing the content of the visual aid, and/or deriving and digitizing the metadata associated with the visual aid, such as determining where the visual aid is presented, its color, and its relative placement with respect to other visual aids, among other metadata.

Next, in operation 310 the content of the physical visual aid is correlated with interactions in the hybrid collaborative communication session. The interactions correlated with the content of the physical visual aid may be interactions with the physical visual aid or interactions with the digitized visual aid during the hybrid collaborative communication session. The content of the physical visual aid may also be correlated with the content of other visual aids presented during the hybrid collaborative communication session. According to a specific example, visual aids with similar content may be identified. According to still other examples, the content of the physical visual aid may be correlated with speech content of participants or physical actions of participants (e.g., a participants presents a visual aid or points to or touches a visual aid).

Finally, in operation 315, hybrid collaborative communication session content is generated based upon the correlation between the content of the physical visual aid and the interactions within the hybrid collaborative communication session. The hybrid collaborative communication session content generated in operation 315 may take many forms, as described below.

Figure 4:
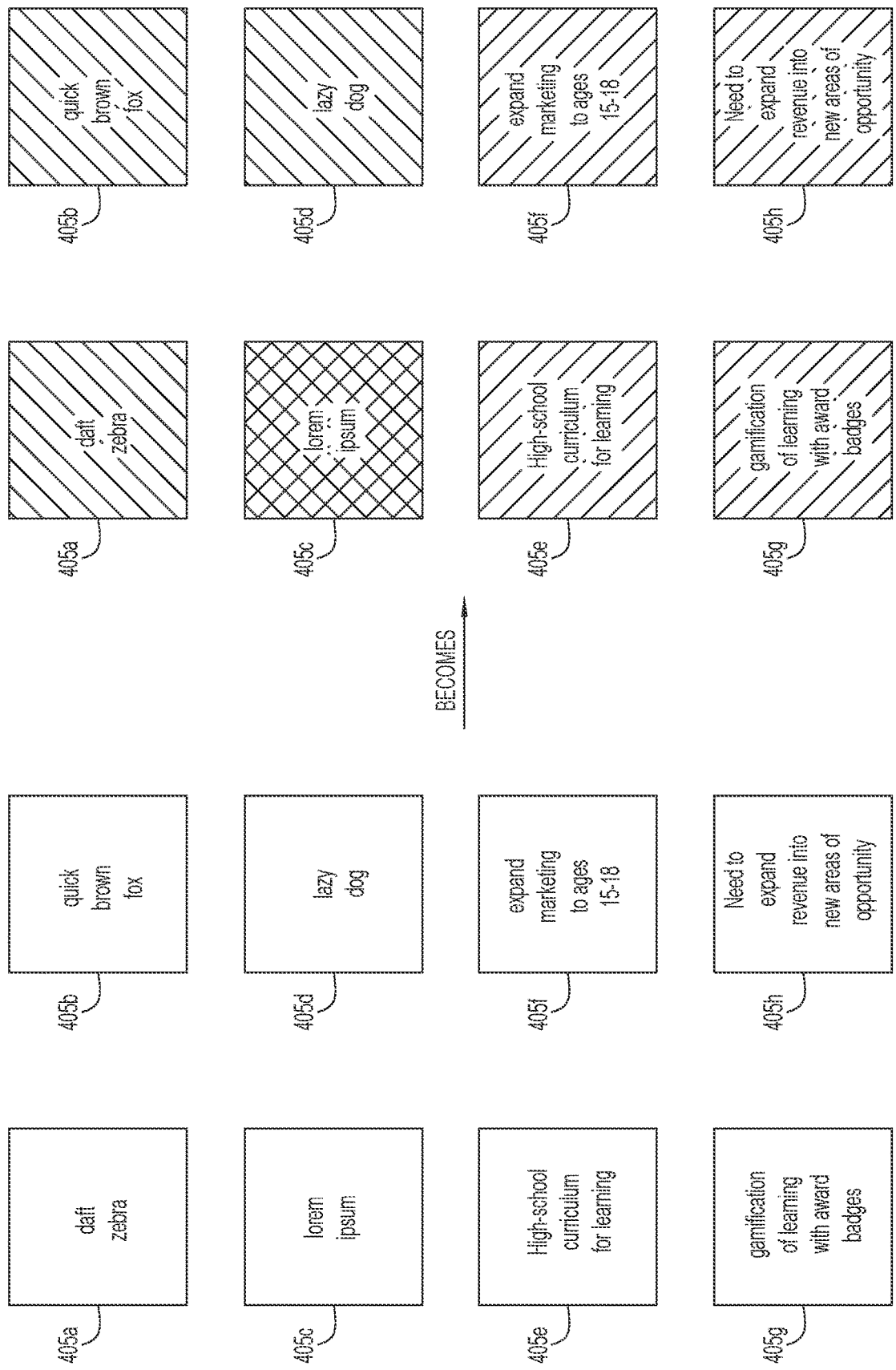
FIG. 4 illustrates the generation of hybrid collaborative communication session content according to the disclosed hybrid collaborative communication session visual aid techniques in which virtual reality or augmented reality versions of visual aids are displayed with different coloring or shading based on their content, according to an example embodiment.

Illustrated in FIG. 4 is the generation of hybrid collaborative communication session content by which AI/ML is used to classify visual aids as having related content, and then augmenting the reality of the visual aids to illustrate the related content. As shown in FIG. 4, sticky note visual aids 405a-405h have been presented during a hybrid collaborative communication session. Using the disclosed techniques, the hybrid collaborative communication session system determines that sticky notes 405a, 405b and 405d have content related to each other, sticky notes 405e, 405f, 405g and 405h have content related to each other, and that sticky note 405c is less related to the other sticky notes. In response to this determination, the hybrid collaborative communication session system renders the sticky notes using different colors or shadings in an VR/AR environment to indicate their relatedness.

More specifically, sticky notes 405a, 405b and 405d all have content related to animals. Therefore, sticky notes 405a, 405b and 405d are rendered in the digital collaborative session environment, including a VR/AR environment, with the same color or shading. Sticky notes 405c, 405f, 405g and 405h are related to ways of expanding a project into the high school student market. Therefore, sticky notes 405e, 405f, 405g and 405h are rendered in the digital collaborative session environment using a color or shading that is the same for sticky notes 405e, 405f, 405g and 405h, but that differs from the shading or color used for the other sticky notes. Sticky note 405c includes placeholder language and is determined to be unrelated to the other sticky notes. Accordingly, sticky note 405c is rendered in the digital collaborative session environment using a color that differs from all of the other sticky notes.

The disclosed techniques may derive the relationships between sticky notes 405a-405h by digitizing the content of sticky notes 405a-405h and using AI/ML classification of the content to determine their relatedness. For example, camera vision may be used to detect the content of sticky notes 405a-405h, and AI/ML algorithms may be used to classify the content into one or more categories and determine their relatedness. Once the relatedness is determined, graphical rendering techniques may be used to render related sticky notes using the same color when viewed by the remote participants as well as by those in the physical room when wearing AR headsets. Similar techniques may be used to de-duplicate physical sticky notes and hide duplicates that exceed confidence over a specific threshold of having a distinct match.

In addition to their content, how participants interact with sticky notes 405a-405h, the placement of sticky notes 405a-405h, the timing of the presentation of sticky notes 405a-450h, and other hybrid collaborative communication session interactions may be used to determine the relatedness, as may combinations of one or more of these or other techniques known to the skilled artisan.

Figure 5:
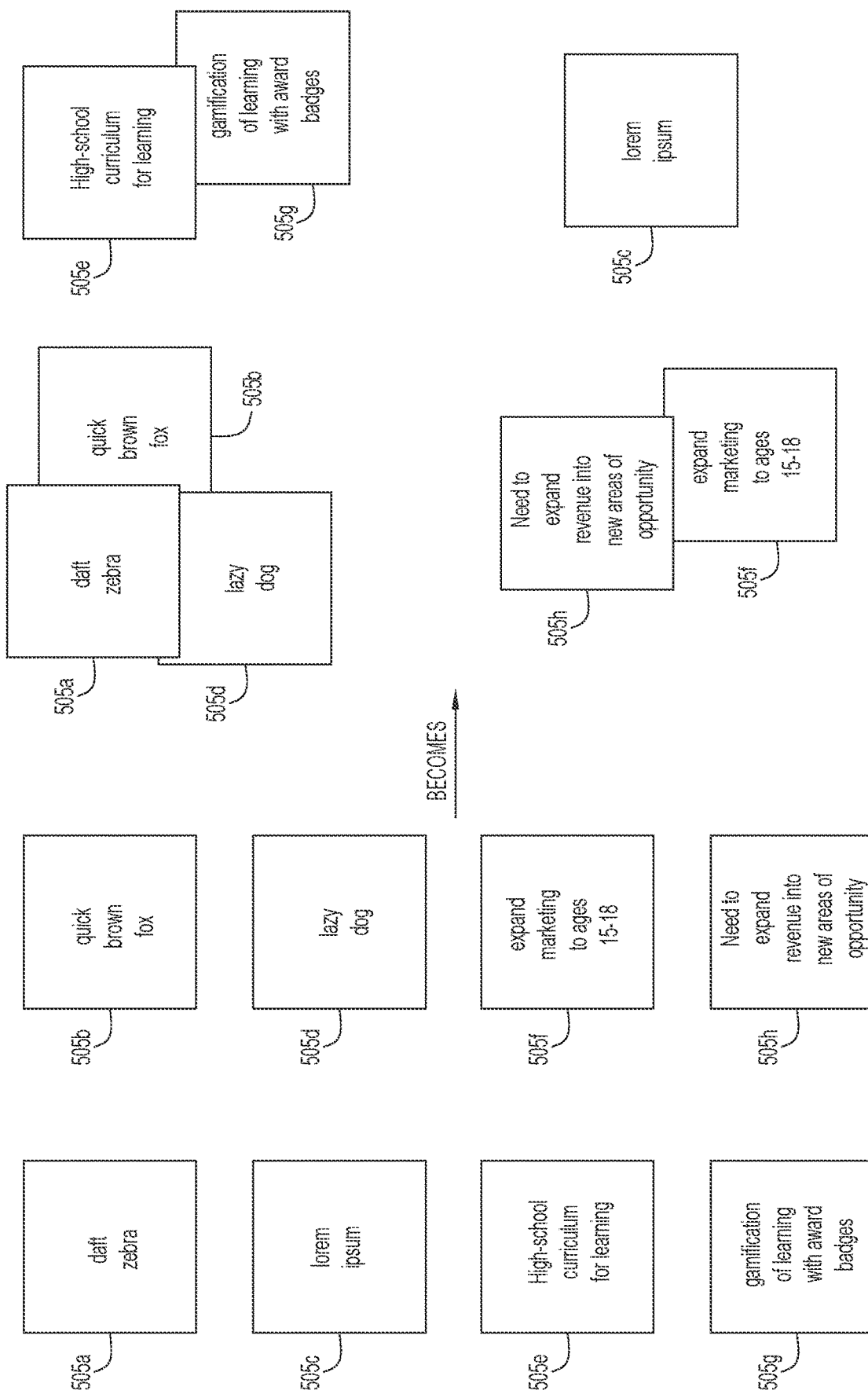
FIG. 5 illustrates the generation of hybrid collaborative communication session content according to the disclosed hybrid collaborative communication session visual aid techniques in which virtual reality or augmented reality versions of visual aids are displayed in different locations based on their content, according to an example embodiment.

With reference now made to FIG. 5, depicted therein is an illustration of how the disclosed techniques may be applied to visual aids where visual aids with related content are clustered into common locations. Similar to the discussion above with reference to sticky notes 405a-405h, the hybrid collaborative communication session system determines that sticky notes 505a, 505b and 505d have content related to each other, sticky notes 505e and 505g have content related to each other, sticky notes 505h and 505f have content related to each other, and that sticky note 505c has content less related to the other sticky notes. For example, camera vision and AI/ML classification techniques may be used to determine the relatedness of the content of sticky notes 505a-505h. As also discussed above, other interactions within the hybrid collaborative communication session may be used to determine the relatedness of sticky notes 505a-505h. However, unlike the example of FIG. 4, sticky notes 505a-505h are not recolored or re-shaded based on their relatedness. Instead, sticky notes 505a-505h are rearranged within a digital, VR or AR environment based upon their respective relatedness, with related sticky notes being clustered together in the digital, VR or AR environment. Accordingly, sticky notes 505a, 505b and 505d are clustered together based on their content being related to animals. Sticky notes 505a and 505g are clustered together based on their content being related to educational techniques. Sticky notes 505h and 505f are clustered together based on their content being related to expanding current business. Finally, sticky note 505c is arranged separately from the other sticky note because its content contains placeholder language that is unrelated to any of the other sticky notes.

Figure 6:
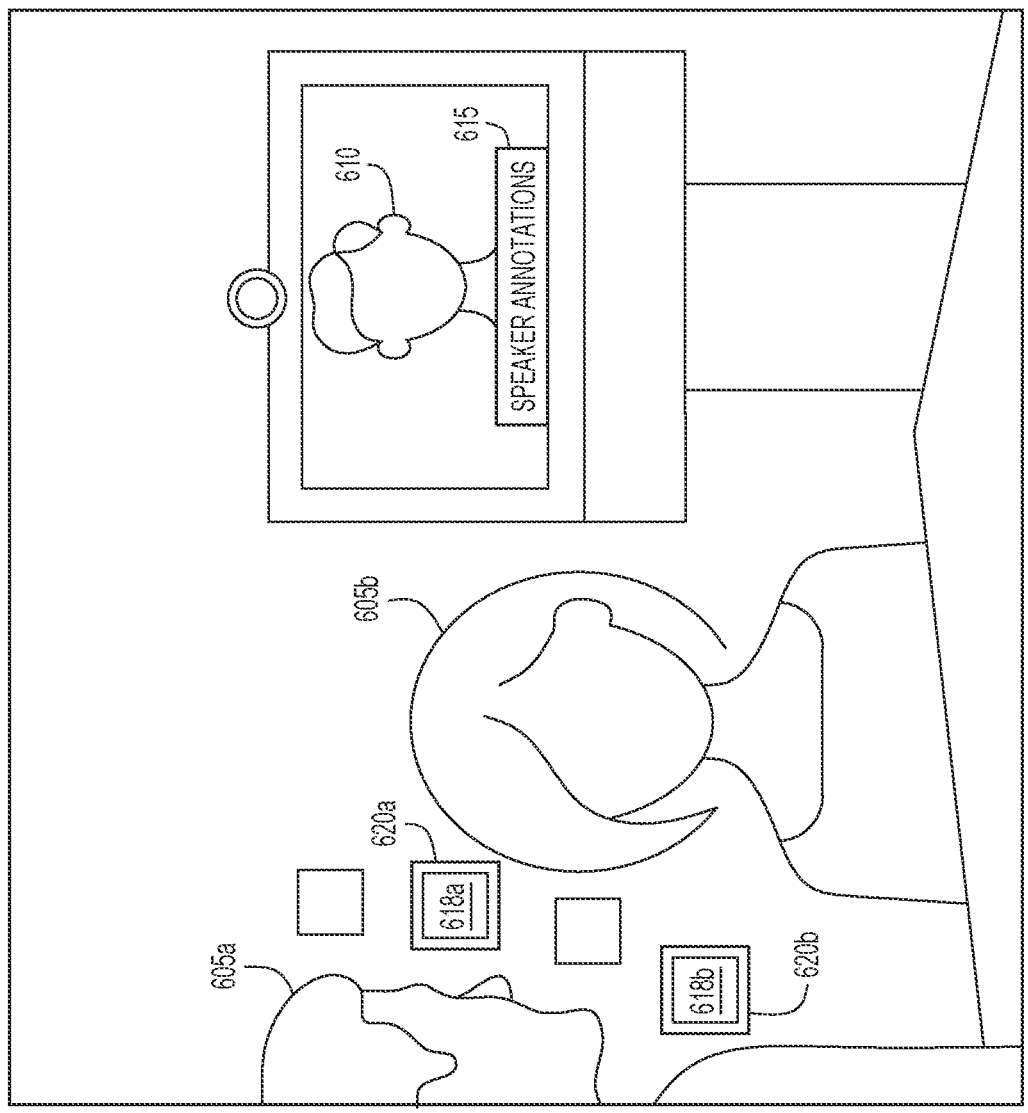
FIG. 6 illustrates a hybrid collaborative communication session environment that includes collaborative session content generated according to the disclosed techniques, according to an example embodiment.

With reference now made to FIG. 6, depicted therein is a hybrid collaborative communication session environment 600 that include collaborative session content generated according to the disclosed techniques. Included in environment 600 are three participants-participants 605a and 605b who are physical participants, and participant 610 who is a virtual participant. Included in environment 600 are speaker annotations 615 and sticky note highlights 620a and 620b. In environment 600, the hybrid collaborative communication session system has leveraged the disclosed techniques such that it generates the annotation 615 to accompany the display of virtual participant 610 when it is detected that participant 610 is speaking. Annotation 615 may be derived from the content of a visual aid, such as a sticky note, that participant 610 has shared during the collaborative session. Annotation 615 may include all visual aid content presented by participant 610, or annotation 615 may be limited to visual aid content related to the topic on which participant 610 is speaking. For example, the hybrid collaborative communication session system may perform speech recognition and AI/ML classification on the speech of participant 610. Based on the classification of the speech, the hybrid collaborative communication session system may select visual aid content presented by participant 610 that is related to the content of the speech. According to other examples, annotation 615 may come from visual aid content presented by other participants, such as physical participants 605a and 605b, but that is nevertheless related to the content of the speech of participant 610. Other types of annotations 615 that may be provided in response to speech from participant 610 may include indications of the role and/or expertise held by participant 610, such as their areas of influence/expertise. Such annotations may be derived from interactions participant 610 has had in the current hybrid collaborative communication session, a history of interactions participant 610 has had in hybrid collaborative communication sessions and/or a profile or data file associated with participant 610 that the hybrid collaborative communication session system can access. Annotation 615 may be provided as digital, AR or VR content.

Also included in environment 600 are visual aid or sticky note highlights 620a and 620b made to sticky notes 618a and 618b, respectively. Highlights 620a and 620b may be generated by the hybrid collaborative communication session system in response to speech from one or more of participants 605a, 605b or 610. As explained above, the hybrid collaborative communication session system may digitize visual aids, such as sticky notes 618a and 618b, presented during the session, including their content. When participants 605a, 605b or 610 speak, the hybrid collaborative communication session system may provide digital, VR or AR highlights 620a and 620b to the sticky notes 618a and 618b, respectively, associated with the speaker. For example, the highlights 620a and 620b may be provided when the speaker who presented them during the session speaks. According to other examples, the hybrid collaborative communication session system may perform speech recognition and AI/ML classification on the speech. In response to the recognition and classification, highlights 620a and 620b may be provided to visual aids whose content matches the classification of the speech. Some examples may highlight all visual aids associated with the speech while other examples may only highlight visual aids presented by the participant whose speech is classified in the same category as the visual aid content. Highlights 620a and 620b may include providing borders, increased brightness, and/or a changed color to the visual aid, among other forms of highlighting.

In addition to highlighting visual aids associated with the speech, the hybrid collaborative communication session system may also diminish digitized visual aids unrelated to the speaker or speech. For example, the color, brightness or focus of digitized visual aids not associated with speech (e.g., visual aids whose content is classified differently than the content of the speech and/or presented by a different participant than the speaker) may be changed by the hybrid collaborative communication session system.

Figure 7:
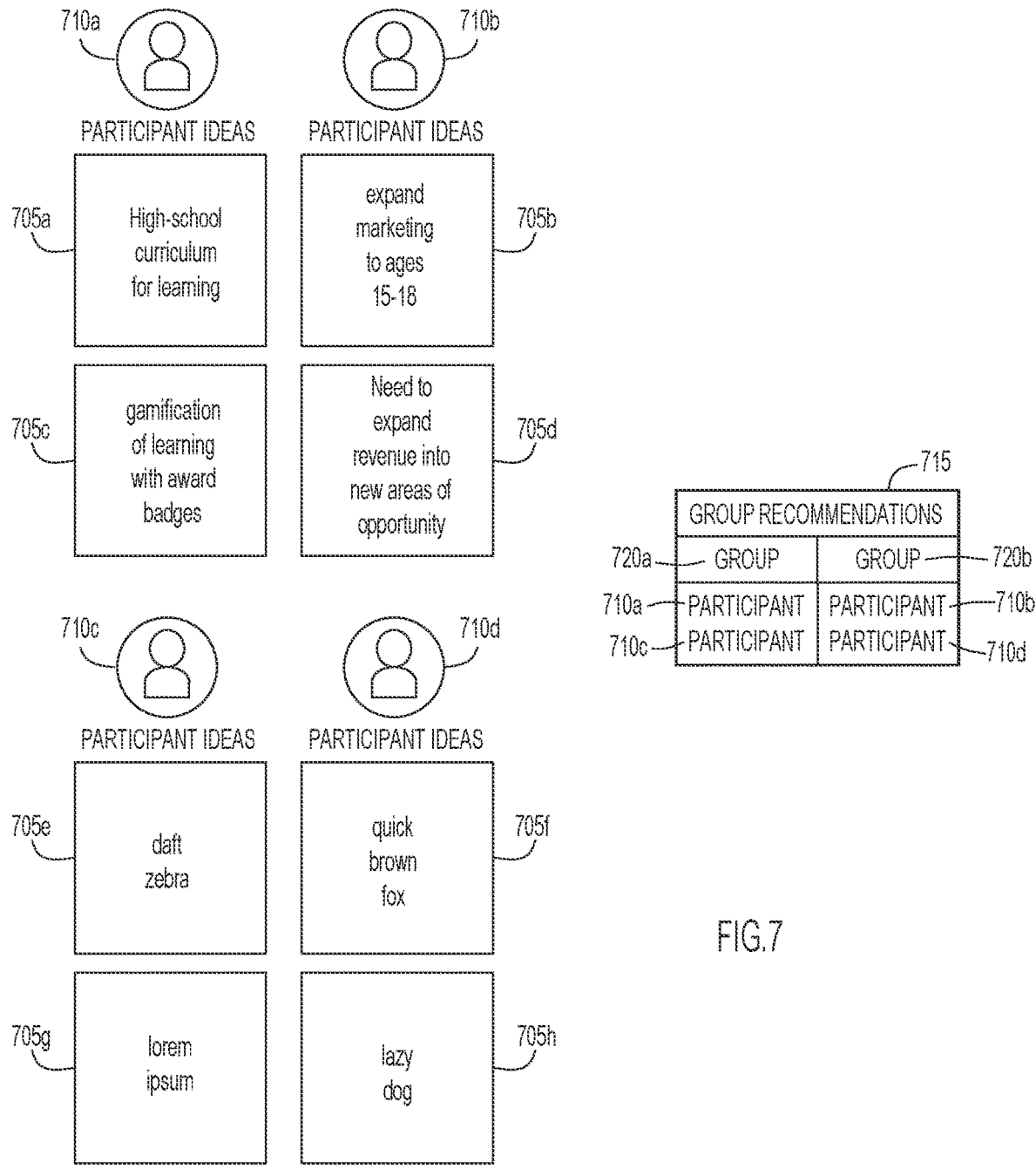
FIG. 7 illustrates breakout session participant or group discussion participant recommendations generated by the disclosed hybrid collaborative communication session visual aid techniques, according to an example embodiment.

The hybrid collaborative communication session content generated according to the disclosed techniques may also take the form of breakout session recommendations, as illustrated in FIG. 7. Included in FIG. 7 are sticky notes 705a-705h which have been classified according to the participant who presented them during a hybrid collaborative communication session. Accordingly, sticky notes 705a and 705c were presented by participant 710a, sticky notes 705b and 705d were presented by participant 710b, sticky notes 705e and 705g were presented by participant 710c and sticky notes 705f and 705h were presented by participant 710d. As described above, the content of sticky notes 705a-705h is also classified by the hybrid collaborative communication session system, which allows the hybrid collaborative communication session system to classify the interests or areas of expertise of participants 710a-710d. For example, the interests and expertise of participants 710a-710d may be determined as corresponding to the content of their respective visual aids—i.e., the participants' interests or expertise may align with the content of the sticky notes that they presented. Accordingly, the hybrid collaborative communication session system may use these determined areas of interest or expertise to generate breakout out group or discussion group recommendation 715. As indicated in group recommendation 715, participants 710a and 710c have been included in Group 720a while participants 710b and 710d have been included in Group 720b.

The purpose or goals of a particular breakout group or discussion group may be used to select which participants are placed in which groups. For example, to drive new or innovative ideas, participants with diverse interests or expertise may be placed in the same group. On the other hand, to establish detailed plans of action for a particular task or project, participants with similar interests or areas of expertise may be placed within the same group related to their areas of interest and expertise. How the groups are to be structured (e.g., with participants with similar interests and expertise or with participants having diverse interests and expertise) may be selected by participants to the hybrid collaborative communication session while the selection of the specific participants for each group may be determined by the hybrid collaborative communication session system. According to a specific example, a group recommendation engine included in the hybrid collaborative communication session system may use classification algorithms to ensure that participants placed in the same groups are interested in similar topics in order to create groups with stronger interaction across the shared perspectives of the participants. According to other examples, the recommendation engine may suggest groups with participants whose categories of interests and expertise are the most diverse sets of individuals, by calculating groups that have the least similarities across the members within each group. Such calculations provide the ability to suggest groups that have diverse or balanced groups of opinions within each group set.

The determination of the interests and expertise of participants 710a-710d may be driven by the content of their respective visual aids and/or interactions within the hybrid collaborative communication session. However, this classification may be supplemented by additional information, such as participant historical interactions in other hybrid collaborative communication sessions or profiles for the participants derived from, for example, social media or hybrid collaborative communication session system profiles. The group recommendation engine may also allow for user input for group design based on parameters (such as: skills, using analytics of base session behavior, personal insights (PI) etc . . . ) to allow for additional granularity in the recommendation engine criteria on how groups are to be formed.

Figure 8:
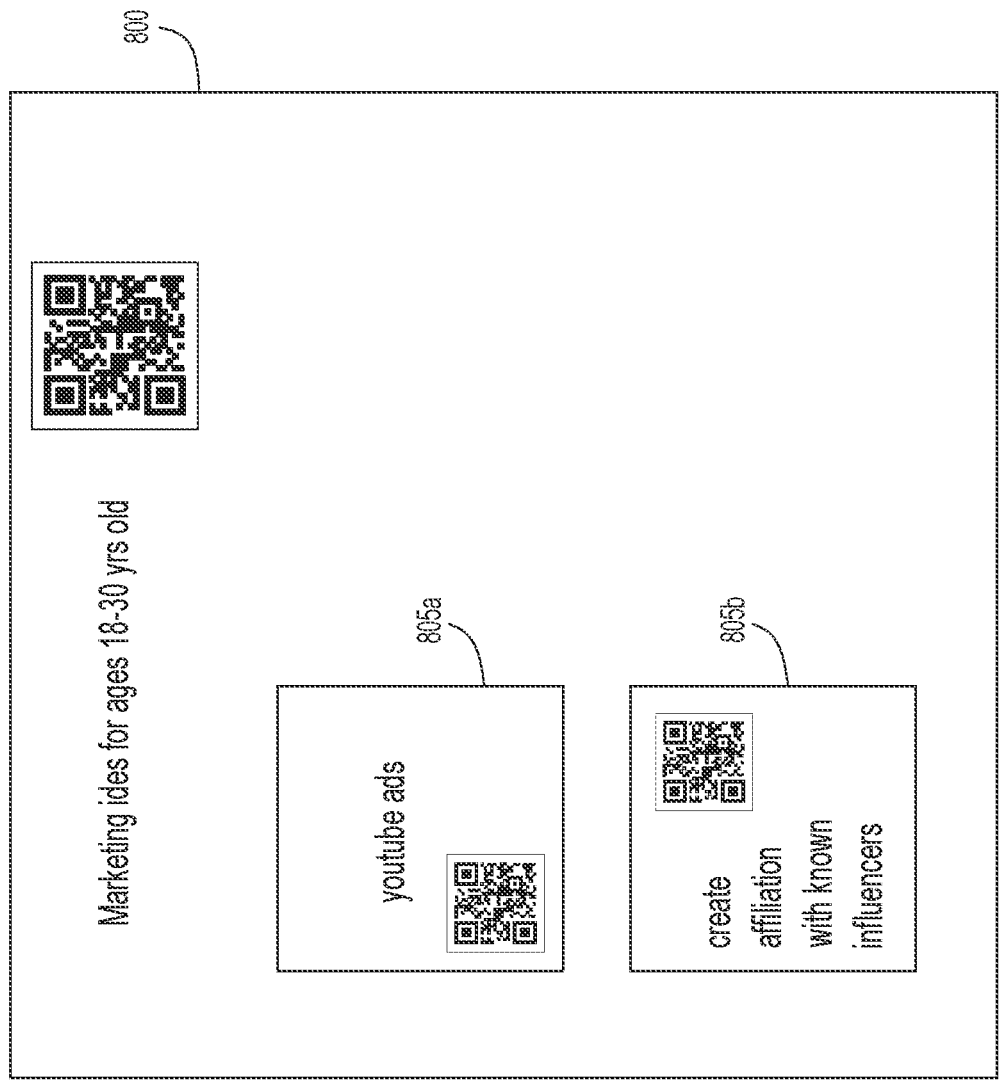
FIG. 8 illustrates the use of the disclosed hybrid collaborative communication session visual aid techniques to combine visual aid content from across multiple hybrid collaborative communication sessions, according to an example embodiment.

Turning to FIG. 8, depicted therein is a category of hybrid collaborative communication session content generated across multiple hybrid collaborative communication sessions. Specifically, included in FIG. 8 is a sticky note 800 that may be generated and presented by the hybrid collaborative communication session system during the hybrid collaborative communication session. Sticky note 800 includes the topic "Marketing ideas for ages 18-30," which may have been derived from visual aids presented during the hybrid collaborative communication session or derived from participant speech during the hybrid collaborative communication session. Included in sticky note 800 are two nested sticky notes 805a and 805b, which are digitized sticky notes that were initially presented as physical sticky notes during one or more previous hybrid collaborative communication sessions. The hybrid collaborative communication session system, because it stores structured data associated with visual aids, can reference this structured data from previous hybrid collaborative communication sessions to generate content for a current hybrid collaborative communication session whose visual aids indicate common subject matter. Nested sticky notes 805a and 805b may serve as hyperlinks to transcript or recording data from the collaborative sessions in which sticky notes 805a and 805b were originally presented. The presentation of this historical information as nested sticky notes 805a and 805b is just one example of how the content may be generated and displayed. According to other examples, non-nested sticky notes displayed in a digital or VR/AR environment, system generated chat messages, and other forms of content may be used to display the historical information.

The disclosed techniques may also be used to generate digital transcript content that includes behavior analytics for the visual aids that are presented, the content of the visual aids, which participant presented the visual aids, and any post-creation interactions with the visual aids (e.g., which participants referenced the visual aid in their speech, moved the visual aid to another location, etc.). By including this information in the digital transcript, the visual aid content is digitized into the transcript and seamlessly included in-line with spoken thoughts and other shared content.

Illustrated in FIG. 9 is a digital transcript 900 generated according to the disclosed techniques. Included in transcript 900 are references and hyperlinks to visual aids, such as sticky notes presented during a hybrid collaborative communication session. As indicated in entry 902, the transcript 900 indicates that a participant "Doug" created a visual aid or "card." Entry 902 includes a hyperlink 905 to the digitized version of the visual aid, provides a local reference identifier 910 that is used to reference that visual aid throughout the transcript, and indicates the digitized content 911 of the visual aid. Transcript 900 entry 912 indicates that "Melissa" suggested that the visual aid's content fit better with another visual aid, and transcript entry 914 indicates that the visual aid was moved from being associated with a visual aid with a local identifier of "D43102" to be associated with another visual aid with a local identifier of "C280238," i.e., the visual aid indicated by "Melissa." In other words, transcript 900 seamlessly incorporates visual aid content into a hybrid collaborative communication session transcript.

Finally, the disclosed techniques may be used to draw context, relevant inferences, organizing session content and provide for future planning. Specifically, the contents of the visual aids, who presented them, and their related employee PI data may now be analyzed by the hybrid collaborative communication session system. By knowing the theme of the session or segment (e.g., organization chart planning, empathy map generation, SWOT (strengths, weaknesses, opportunities, and threats) analysis) and applying analytics to produce a report containing hybrid collaborative communication session takeaways, hybrid collaborative communication session systems may be leveraged to:

a) Identify the most valuable participants in terms of influencing thinking by these analytics (participation scores etc.). These participants may prove valuable in future sessions and/or perhaps should be counterbalanced.

b) Produce an overall "consensus score" among participants, based on metrics such as how many voted for each sticky note, how many placed similar ideas on their notes, or other ways of measuring a participant's level of participation and engagement with the visual aids. Such a score may be used in future planning for participant attendance. For example, the scores may be used to determine if curated roles may be employed among the participants to reach a consensus.

c) Identify if areas of divergent thinking are present based on the number of sticky notes per topic and their movement.

d) Augment an individual's PI insights with the collaboration participant score and use breakout suggestions and session planning to ensure a good mix of behaviors as well as roles, grades, functions etc. are present.

e) Highlight red-flag or anomalous behavior with a corresponding documentation stream of what occurred (an example of which could include transcript 900 of FIG. 9 combined with behavior analytics). Such indications and documentation may be invaluable to performing postmortem analysis for areas of disagreement, indecision and/or conflict resolution.

f) Identify which visual aids generated the most discussion.

Figure 10:
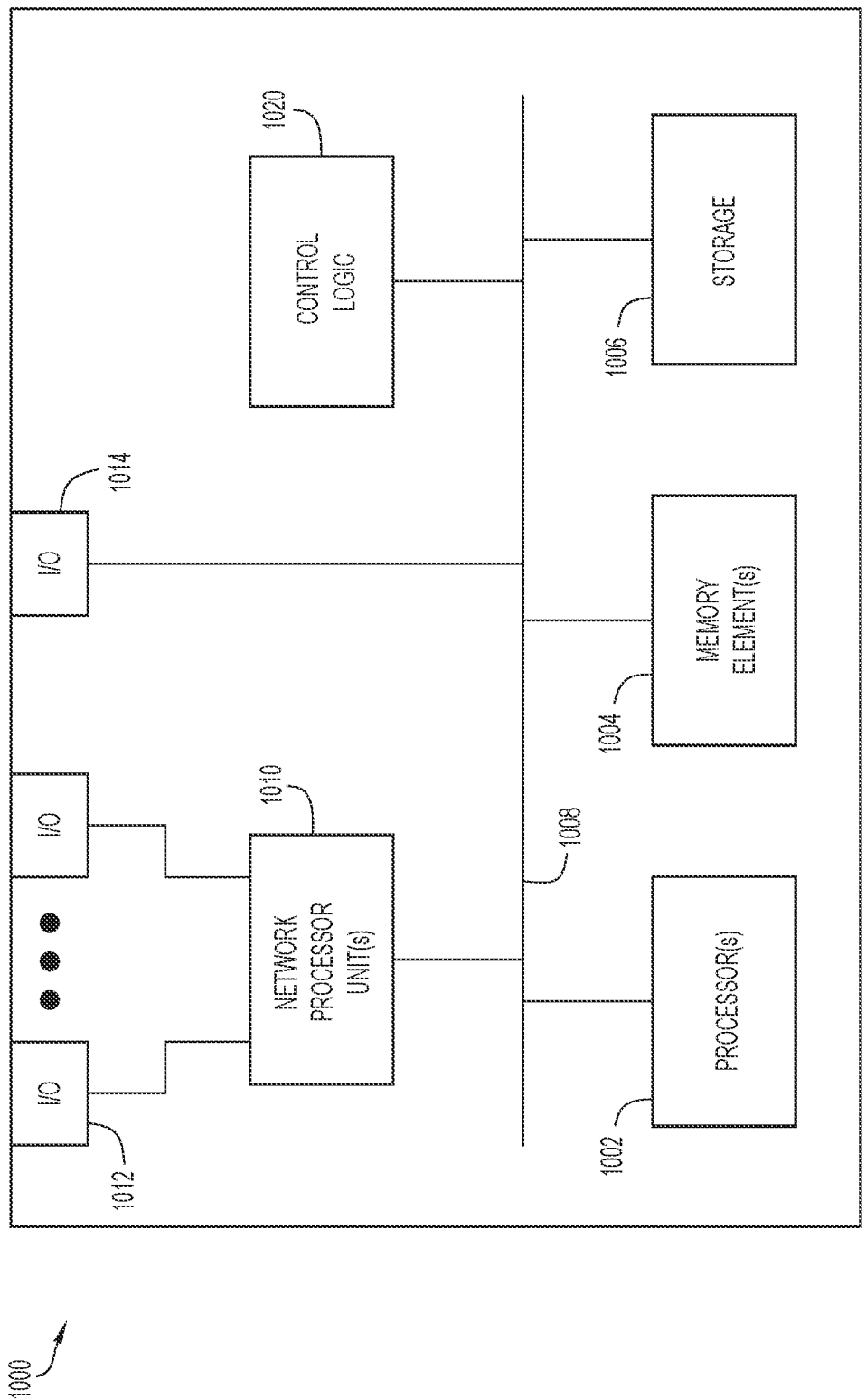
FIG. 10 is a hardware block diagram of a device configured to implement the disclosed hybrid collaborative communication session visual aid techniques, according to an example embodiment.

Referring to FIG. 10, FIG. 10 illustrates a hardware block diagram of a device 1000 that may perform functions associated with operations discussed herein in connection with the techniques depicted in FIGS. 1A-C and 2-9. The device 1000 may be a computer (laptop, desktop, etc.) or other device involved in video encoding/decoding operations, including video conference equipment, Smartphones, tablets, streaming servers, etc.

In at least one embodiment, the device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. I/O interfaces 1012 and 1014 may connect to the microphone, camera and display devices, including VR/AR headset described above. In various embodiments, instructions associated with logic for device 1000 can overlap in any manner and are not limited to the specific allocation of instructions and/or operations described herein.

In at least one embodiment, processor(s) 1002 is/are at least one hardware processor configured to execute various tasks, operations and/or functions for device 1000 as described herein according to software and/or instructions configured for device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with device 1000, and/or logic configured for memory element(s) 1004 and/or storage 1006. For example, any logic described herein (e.g., control logic 1020) can, in various embodiments, be stored for device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of device 1000 to communicate in order to exchange information and/or data. Bus 1008 can be implemented with any architecture designed for passing control, data and/or information between processors, memory elements/storage, peripheral devices, and/or any other hardware and/or software components that may be configured for device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment. The hardware-based packet classification solution may be integrated into one or more ASICs that form a part or an entirety of the network processor unit(s) 1010.

I/O interface(s) 1014 allow for input and output of data and/or information with other entities that may be connected to device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, a VR/AR device, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, by detecting sticky note placement and content creation, and digitizing the content for classification/recommendation/annotation, the disclosed techniques enable a collective seamless experience across different user types of participants and enhance how hybrid collaborative communication sessions are consumed through mixed reality channels, even extending beyond what is possible in the pure analog experience of every participant in the same room.

Accordingly, in some aspects, the techniques described herein relate to a method including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

In some aspects, the techniques described herein relate to a method, wherein the physical visual aid includes a sticky note.

In some aspects, the techniques described herein relate to a method, wherein generating the hybrid collaborative communication session content includes: detecting speech content within the hybrid collaborative communication session; and matching the speech content with the content of the physical visual aid.

In some aspects, the techniques described herein relate to a method, wherein generating the hybrid collaborative communication session content further includes providing a display of a participant providing the speech content concurrently with a label including the content of the physical visual aid.

In some aspects, the techniques described herein relate to a method, wherein generating the hybrid collaborative communication session content further includes highlighting a display of the digitized visual aid concurrently with a display of a participant providing the speech content.

In some aspects, the techniques described herein relate to a method, wherein generating the hybrid collaborative communication session content includes altering a display of the digitized visual aid to display the digitized visual aid in substantially a same location as one or more additional digitized visual aids with content matching the content of the physical visual aid or providing the digitized visual aid with a display characteristic matching a display characteristic of the one or more additional digitized visual aids with content matching the content of the physical visual aid.

In some aspects, the techniques described herein relate to a method wherein correlating the content of the physical visual aid with participant interactions within the hybrid collaborative communication session includes using artificial intelligence or machine learning algorithms to classify the content of the physical visual aid into one or more categories.

In some aspects, the techniques described herein relate to a method, wherein generating the hybrid collaborative communication session content includes generating a breakout group or discussion group participant recommendation.

In some aspects, the techniques described herein relate to a method, wherein generating the hybrid collaborative communication session content includes: determining the content of the physical visual aid correlates with content of a historical digitized visual aid presented during a previous hybrid collaborative communication session; and displaying the historical digitized visual aid during the hybrid collaborative communication session.

In some aspects, the techniques described herein relate to a method, wherein generating the hybrid collaborative communication session content includes generating a transcript of the hybrid collaborative communication session that includes indications of participant interactions with the digitized visual aid or indications of participant interactions with the physical visual aid during the hybrid collaborative communication session.

In some aspects, the techniques described herein relate to a method, wherein generating the hybrid collaborative communication session content includes generating content that includes: data indicative of valuable participants in the hybrid collaborative communication session; data indicative of a consensus score associated with the physical visual aid; data indicative of a participation score associated with the physical visual aid; data indicative of recommended breakout session participants; or data indicative of results of the hybrid collaborative communication session.

In some aspects, the techniques described herein relate to an apparatus including: a communication interface configured to enable network communications; a memory; and one or more processors coupled to the communication interface and the memory, wherein the one or more processors are configured to perform operations including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

In some aspects, the techniques described herein relate to an apparatus, wherein the physical visual aid includes a sticky note.

In some aspects, the techniques described herein relate to an apparatus, wherein the operation of generating the hybrid collaborative communication session content includes operations including: detecting speech content within the hybrid collaborative communication session; and matching the speech content with the content of the physical visual aid.

In some aspects, the techniques described herein relate to an apparatus, wherein the operation of generating the hybrid collaborative communication session content further includes providing a display of a participant providing the speech content concurrently with a label including the content of the physical visual aid.

In some aspects, the techniques described herein relate to an apparatus, wherein the operation of generating the hybrid collaborative communication session content further includes highlighting a display of the digitized visual aid concurrently with a display of a participant providing the speech content.

In some aspects, the techniques described herein relate to one or more tangible non-transitory computer readable media encoded with instructions, wherein the instructions, when executed by one or more processors cause the one or more processors to perform operations including: digitizing a physical visual aid presented in a hybrid collaborative communication session to generate a digitized visual aid and data indicative of content of the physical visual aid; correlating the content of the physical visual aid with participant interactions within the hybrid collaborative communication session; and generating hybrid collaborative communication session content based upon the correlating the content of the physical visual aid with the participant interactions within the hybrid collaborative communication session.

In some aspects, the techniques described herein relate to one or more tangible non-transitory computer readable media, wherein the physical visual aid includes a sticky note.

In some aspects, the techniques described herein relate to one or more tangible non-transitory computer readable media, wherein the operation of generating the hybrid collaborative communication session content includes operations including: detecting speech content within the hybrid collaborative communication session; and matching the speech content with the content of the physical visual aid.

In some aspects, the techniques described herein relate to one or more tangible non-transitory computer readable media, wherein the operation of generating the hybrid collaborative communication session content further includes providing a display of a participant providing the speech content concurrently with a label including the content of the physical visual aid.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X. Y or Z', 'one or more of X, Y and Z', 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer implemented method performed by one or more processors, the method comprising:
   digitizing a physical visual aid presented in a hybrid collaborative communication session to generate a digitized visual aid and data indicative of content of the physical visual aid;
   deriving data indicative of content from participant interactions within the hybrid collaborative communication session, the participant interactions including physical actions of participants;
   classifying the content of the physical visual aid into a first category;
   classifying the content associated with the participant interactions within the hybrid collaborative communication session into a second category;
   determining that the first category is related to the second category, wherein determining that the first category is related to the second category includes matching a category of the content associated with the participant interactions with the first category by identifying the category of the content associated with the participant interactions as being the same as the first category; and
   altering presentation of the digitized visual aid during the hybrid collaborative communication session based upon determining that the first category is related to the second category.

2. The method of claim 1, wherein the physical visual aid comprises a sticky note, wherein altering the presentation of the digitized visual aid during the hybrid collaborative communication session includes changing a color, brightness, and/or a focus of the digitized visual aid.

3. The method of claim 1:
   wherein deriving the data indicative of the content from the participant interactions within the hybrid collaborative communication session comprises detecting speech content within the hybrid collaborative communication session; and
   wherein determining that the first category is related to the second category comprises matching a category of the speech content with the first category by identifying the category of the speech content as being the same as the first category.

4. The method of claim 3, wherein altering the presentation of the digitized visual aid during the hybrid collaborative communication session comprises:
   providing a display of a participant providing the speech content concurrently with a label comprising the content of the physical visual aid; and
   highlighting the digitized visual aid as being associated with the speech content, the digitized visual aid being a first digitized visual aid, wherein highlighting the first digital visual aid includes diminishing one or more additional digitized visual aids.

5. The method of claim 3, wherein altering the presentation of the digitized visual aid during the hybrid collaborative communication session comprises highlighting a display of the digitized visual aid concurrently with a display of a participant providing the speech content.

6. The method of claim 1, wherein altering the presentation of the digitized visual aid during the hybrid collaborative communication session comprises altering a display of the digitized visual aid to display the digitized visual aid in substantially a same location as one or more additional digitized visual aids with content matching the content of the physical visual aid or providing the digitized visual aid with a display characteristic matching a display characteristic of the one or more additional digitized visual aids with content matching the content of the physical visual aid.

7. The method of claim 1 wherein classifying the content of the physical visual aid into the first category, classifying the content associated with the participant interactions within the hybrid collaborative communication session into the second category or determining that the first category is related to the second category comprises using artificial intelligence or machine learning algorithms.

8. The method of claim 1, further comprising generating a breakout group or discussion group participant recommendation from the first category and the second category for participants in the hybrid collaborative communication session, wherein generating the breakout group or discussion group participant recommendation includes determining interests or expertise of the participants based on the content of the physical visual aid and the participant interactions.

9. The method of claim 1, further comprising:
generating a transcript of the hybrid collaborative communication session that comprises indications of participant interactions with the digitized visual aid or indications of participant interactions with the physical visual aid during the hybrid collaborative communication session, wherein the indications of participant interactions with the digitized visual aid or the indications of participant interactions with the physical visual aid during the hybrid collaborative communication session are stored as structured data, the structured data including a history of participant interactions with the digitized visual aid or the physical visual aid, and wherein generating the transcript includes obtaining the structured data.

10. The method of claim 1, further comprising generating content that includes:
data indicative of valuable participants in the hybrid collaborative communication session;
data indicative of a consensus score associated with the physical visual aid;
data indicative of a participation score associated with the physical visual aid;
data indicative of recommended breakout session participants; or
data indicative of results of the hybrid collaborative communication session.

11. An apparatus comprising:
a communication interface configured to enable network communications;
a memory; and
one or more processors coupled to the communication interface and the memory, wherein the one or more processors are configured to perform operations including:
digitizing a physical visual aid presented in a hybrid collaborative communication session to generate a digitized visual aid and data indicative of content of the physical visual aid;
deriving data indicative of content from participant interactions within the hybrid collaborative communication session, the participant interactions including physical actions of participants;
classifying the content of the physical visual aid into a first category;
classifying the content associated with the participant interactions within the hybrid collaborative communication session into a second category;
determining that one or more of the first category is related to one or more of the second category; and
altering presentation of the digitized visual aid during the hybrid collaborative communication session based upon determining that the first category is related to the second category.

12. The apparatus of claim 11, wherein the physical visual aid comprises a sticky note, wherein altering the presentation of the digitized visual aid during the hybrid collaborative communication session includes changing a color, brightness, and/or a focus of the digitized visual aid.

13. The apparatus of claim 11, wherein:
the operation of deriving the data indicative of content from participant interactions within the hybrid collaborative communication session comprises detecting speech content within the hybrid collaborative communication session; and
the operation of determining that the first category is related to the second category comprises matching at category of the speech content with the first category.

14. The apparatus of claim 13, wherein the operation of altering the presentation of the digitized visual aid during the hybrid collaborative communication session comprises:
providing a display of a participant providing the speech content concurrently with a label comprising the content of the physical visual aid; and
highlighting the digitized visual aid as being associated with the speech content, the digitized visual aid being a first digitized visual aid, wherein highlighting the first digital visual aid includes diminishing one or more additional digitized visual aids.

15. The apparatus of claim 13, wherein the operation of altering the presentation of the digitized visual aid during the hybrid collaborative communication session comprises highlighting a display of the digitized visual aid concurrently with a display of a participant providing the speech content.

16. One or more tangible non-transitory computer readable media encoded with instructions, wherein the instructions, when executed by one or more processors cause the one or more processors to perform operations including:
digitizing a physical visual aid presented in a hybrid collaborative communication session to generate a digitized visual aid and data indicative of content of the physical visual aid;
deriving data indicative of content from participant interactions within the hybrid collaborative communication session, the participant interactions including physical actions of participants;
classifying the content of the physical visual aid into a first category;
classifying the content associated with the participant interactions within the hybrid collaborative communication session into a second category;
determining that one or more of the first category is related to one or more of the second category; and
altering presentation of the digitized visual aid during the hybrid collaborative communication session based upon determining that the first category is related to the second category.

17. The one or more tangible non-transitory computer readable media of claim 16, wherein the physical visual aid comprises a sticky note, wherein altering the presentation of the digitized visual aid during the hybrid collaborative communication session includes changing color, brightness, and/or a focus of the digitized visual aid.

18. The one or more tangible non-transitory computer readable media of claim 16, wherein:
the operation of deriving the data indicative of content from participant interactions within the hybrid collaborative communication session comprises detecting speech content within the hybrid collaborative communication session; and
wherein the operation of determining that the first category is related to the second category comprises matching a category of the speech content with the first category.

19. The one or more tangible non-transitory computer readable media of claim 18, wherein the operation of altering the presentation of the digitized visual aid during the hybrid collaborative communication session comprises:
providing a display of a participant providing the speech content concurrently with a label comprising the content of the physical visual aid; and
highlighting the digitized visual aid as being associated with the speech content, the digitized visual aid being a first digitized visual aid, wherein highlighting the first digital visual aid includes diminishing one or more additional digitized visual aids.

20. The one or more tangible non-transitory computer readable media of claim 16, wherein the operations further comprise generating a breakout group or discussion group participant recommendation from the first category and the second category for participants in the hybrid collaborative communication session, wherein generating the breakout group or discussion group participant recommendation includes determining interests or expertise of the participants based on the content of the physical visual aid and the participant interactions.

21. The method of claim 1 wherein the physical interactions include at least one selected from a group including a first participant presenting the physical visual aid, the first participant pointing to the physical visual aid, and the first participant touching the physical visual aid.

\* \* \* \* \*